United States Patent
Barros

[11] Patent Number: 5,300,882
[45] Date of Patent: Apr. 5, 1994

[54] INDUCTIVE POSITION SENSOR FOR DETERMINING THE ANGULAR POSITION OF A ROTATING SHAFT

[75] Inventor: José Barros, Geneva, Switzerland

[73] Assignee: Baumer Electric A.G., Switzerland

[21] Appl. No.: 835,474

[22] PCT Filed: Jun. 26, 1991

[86] PCT No.: PCT/CH91/00141
§ 371 Date: Mar. 16, 1992
§ 102(e) Date: Mar. 16, 1992

[87] PCT Pub. No.: WO92/00505
PCT Pub. Date: Jan. 9, 1992

[30] Foreign Application Priority Data
Jun. 27, 1990 [CH] Switzerland .................. 2141/90

[51] Int. Cl.$^5$ .................. G01B 7/30; G01D 5/20; H01F 21/02
[52] U.S. Cl. .................. 324/207.17; 324/207.25; 336/45
[58] Field of Search .................. 324/160, 163, 173, 174, 324/207.17, 207.18, 207.19, 207.25; 310/68 B, 168; 340/870.31, 870.32; 336/30, 45

[56] References Cited
U.S. PATENT DOCUMENTS

| 3,742,340 | 6/1973 | Kiedrowski | 324/207.17 X |
| 4,507,638 | 3/1985 | Brosh |  |
| 4,755,751 | 7/1988 | Ray | 324/207.25 X |

FOREIGN PATENT DOCUMENTS
911664 8/1953 Fed. Rep. of Germany.
60-102860 10/1985 Japan.

Primary Examiner—Gerard R. Strecker
Attorney, Agent, or Firm—Woodard, Emhardt, Naughton, Moriarty & McNett

[57] ABSTRACT

The sensor comprises a field coil generating a time-variant magnetic field, and sensor coils arranged inside the field coil, a rotatable device being arranged for modulating the magnetic flux passing through the sensor coil according to its angular position. Each sensor coil comprises a magnetically permeable core having a polar portion facing the rotatable device. A portion of a magnetically permeable sealing element is arranged facing the rotatable device on the opposite side from said polar portion. The air gaps between said polar portion and rotatable device, and between said portion of the sealing element and said rotatable device, are wholly located substantially within the field coil.

8 Claims, 1 Drawing Sheet

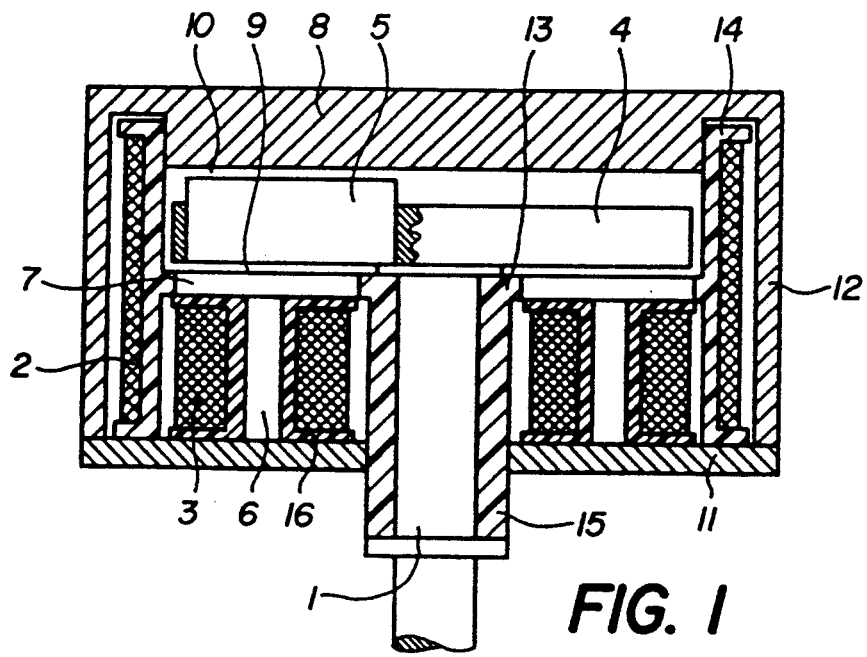
FIG. 1
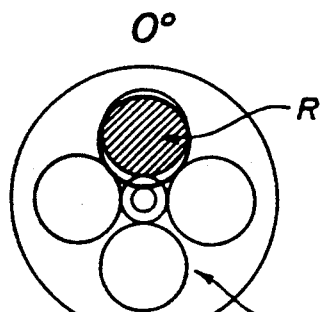
FIG. 2(a) 0°
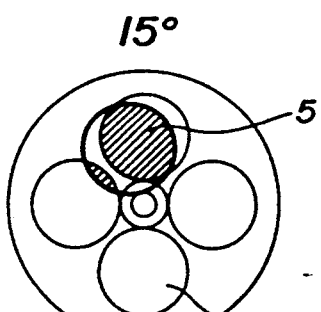
FIG. 2(b) 15°
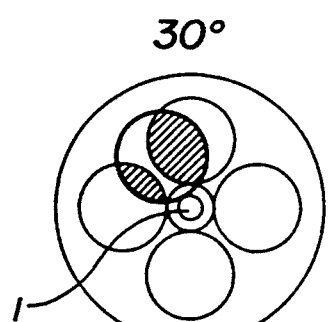
FIG. 2(c) 30°
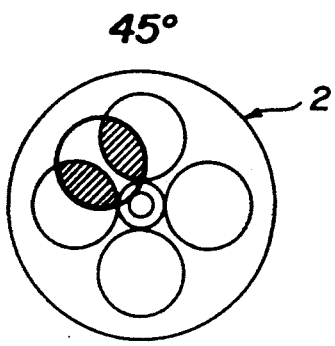
FIG. 2(d) 45°
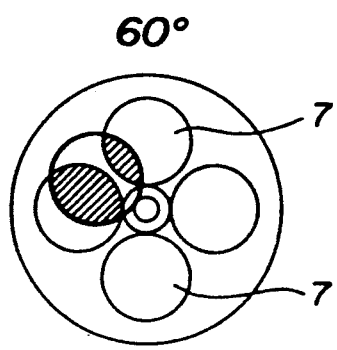
FIG. 2(e) 60°
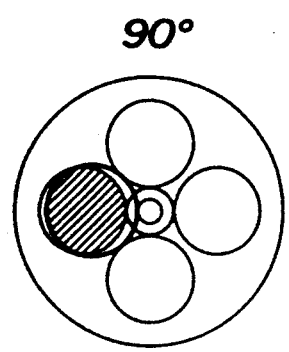
FIG. 2(f) 90°

INDUCTIVE POSITION SENSOR FOR DETERMINING THE ANGULAR POSITION OF A ROTATING SHAFT

FIELD OF THE INVENTION

The present invention relates to a position sensor for determining the angular position of a rotating shaft comprising a field coil for generating a time-variant magnetic field, at least one sensor coil arranged inside the field coil and a rotatable member arranged for modulating the magnetic flux passing through the sensor coil in accordance with its angular position.

BACKGROUND OF THE INVENTION

Sensors of this type are known in the art. The angular position of a shaft is determined from the signal obtained at the terminals of the sensor coil or coils. However, in the known devices, the amplitude of the variation of the signal as a function of the angular variation of the shaft is relatively small and the precision of the measure is often insufficient.

SUMMARY OF THE INVENTION

The position sensor according to the invention comprises a field coil for generating a time-variant magnetic field, a magnetically conductive housing structure supporting the field coil, at least one sensor coil arranged inside the field coil and supported by the housing structure, and a rotatable member supported for rotation inside the housing structure. The rotatable member is coupled with said rotating shaft and arranged for modulating the magnetic flux passing inside the sensor coil in accordance with its angular position. Each sensor coil comprises a winding and a magnetically permeable core with a flat polar part extending outside said winding so as to face the rotatable member. At least one portion of said housing structure coupled with said field coil is arranged to face the rotatable member on the opposite side from said polar part. The arrangement is such that the air-gaps existing between said polar part and said rotatable member on the one hand, and said portion of said housing structure and the rotatable member on the other hand, are located substantially within the field coil.

It is an object of the present invention to provide a position sensor of the type mentioned at the beginning, which has a simple, economic and compact structure and which produces a position signal of a relatively high amplitude and of very good precision.

The features and the advantages of the present invention will be better understood in the light of the following description relating to one example of embodiment of the sensor according to the invention, illustrated by the attached drawing figures.

BRIEF DESCRIPTION OF THE DRAWINGS

FIG. 1 is an axial section of a position sensor according to the invention, and

FIGS. 2(a) to 2(f) are a simplified representation illustrating the operation of the sensor through different positions of the rotatable member.

DESCRIPTION OF THE PREFERRED EMBODIMENT

The sensor of FIG. 1 comprises a housing composed of a supporting plate 11 and a closing member 12 made of a magnetically permeable material. A part of plastic material 13 is arranged inside this housing and constitutes, in particular, a coil body 14 and a bearing part 15 in which the end of a rotatable shaft 1 is lodged. The shaft 1 is integral with a rotatable member comprising a disc-shaped support 4 and a part 5 such as a ferrite tablet in the present example.

The coil body 14 is used as a support for the winding 2 of a cylindrical field coil which extends over practically the whole height of the closing member 12. On the supporting plate 11, four sensing coils are arranged in a symmetrical way, each being constituted by a winding 3, a coil body 16 and a core 6. Each core 6 is provided with a polar part 7 extending above coil 3 so as to conduct the magnetic flux generated by the field coil winding 2. Two of these sensing coils are shown in axial section in FIG. 1.

In the present example, the polar parts 7 have a circular shape and the ferrite tablet 5 is also substantially of circular cylindrical shape. The support 4 is preferably made of an electrically conductive material, for example of aluminum. The closing member 12 comprises a part 8 which is arranged opposite the rotatable member and which forms with the same an air-gap 10, while an air-gap 9 is formed between the rotatable member and the polar parts 7. These air-gaps have preferably a minimal height having regard to the manufacturing tolerances which must allow the movement of the rotatable member. As will be noted from FIG. 1, not only the air-gap 9 but also the air-gap 10 is located substantially inside the field coil 2, so that the magnetic field generated by a current in this field coil is substantially uniform inside these air-gaps. This field is closed essentially through the cores 6, the polar parts 7, the support plate 11 and the closing member 12.

Upon rotation of the shaft 1, the magnetic flux which passes through the sensor coils and which varies in time as the energizing current in coil 2, varies in amplitude in each coil as a function of the angular position of the tablet 5 with respect to the corresponding polar parts 7.

FIGS. 2(a) to 2(f) illustrate different positions of the rotatable member with respect to the polar parts of the four sensor coils which are connected in a known way, so that two diametrically opposite coils form half-phases of a same phase. The shape and the dimensions of the polar parts and of the tablet 5 are preferably chosen in such a way that the variation of the amplitude of the magnetic flux is continuous in the two coils of a same phase, in other words, such that when the tablet 5 no longer covers (region R) partially a polar part, it starts covering the diametrically opposite polar part. Different characteristics of flux variations as a function of the angular position of the rotatable member can be obtained by the shapes and the dimensions of the facing parts, this variation being, for example, in particular sinusoidal.

The variation of the magnetic flux passing through the different coils results in a corresponding modulation of the voltage in the sensor coils which provides the measuring signal. The support 4 of the magnetically permeable part 5 will, in the present case, be the seat of eddy currents which reduce the strength of the field outside part 5 and thus increase the difference between the maximum and minimum values of the voltage induced in the sensor coils. To avoid that these eddy currents also close around the tablet 5, a gap can be provided in the support 4 at a place on the periphery of that part, between the same and the edge of support 4.

The present arrangement of the position sensor leads to a particularly compact structure reduces the losses of magnetic energy and provides a relatively high output signal. Furthermore, the precision of such a sensor is very good due to the uniformity of the magnetic field and the relative indifference to the manufacturing tolerances. It is to be noted that the air-gaps 9 and 10 sum up and that their individual variations in dimension have practically no influence on the measure. As FIG. 1 shows, the volume of the sensor is used in an optimal way for lodging the greatest volume of active elements.

It is to be noted that, besides a flux modulation by a part such as 5 which increases the flux in the region it overlaps, it is also possible to provide, for example, one or more electrically conductive turns of coils to reduce, on the contrary, the field passing through that region. Other embodiments are also available within the scope of the present invention to a person skilled in the art.

I claim:

1. A position sensor for determining the angular position of a rotating shaft, comprising a cylindrical field coil for generating a time-variant magnetic field, a magnetically conductive housing structure supporting said field coil, at least one sensor coil arranged inside said field coil and supported by said housing structure, and a rotatable member supported for rotation inside said housing structure, said rotatable member being coupled with said rotating shaft through an aperture in said housing structure and being arranged for modulating the magnetic flux produced by said time-variant magnetic field and passing inside the sensor coil in accordance with its angular position, each sensor coil comprising a winding and a magnetically permeable core with a flat polar part extending outside said winding so as to face the rotatable member, at least one portion of said housing structure coupled with said field coil being arranged to face the rotatable member on the opposite side from said polar part, the arrangement being such that the air-gaps existing between said polar part and said rotatable member on the one hand, and said portion of said housing structure and the rotatable member on the other hand are located substantially within said field coil.

2. Sensor according to claim 1, characterized in that the height of said air-gaps has a minimum value having regard to the manufacturing tolerances.

3. Sensor according to claim 2, characterized in that the rotatable member comprises a part of magnetically permeable material in a non-magnetic support.

4. Sensor according to claim 3, characterized in that the support is in an electrically conductive material.

5. Sensor according to claim 4, characterized in that the support has an electric discontinuity at at least one place on the periphery of the permeable part of the rotatable member.

6. Sensor according to claim 1, characterized in that the rotatable member comprises a part of magnetically permeable material in a non-magnetic support.

7. Sensor according to claim 6, characterized in that the support is in an electrically conductive material.

8. Sensor according to claim 7, characterized in that the support has an electric discontinuity at at least one place of the periphery of the permeable part of the rotatable member.

* * * * *